United States Patent
Moodliar et al.

(10) Patent No.: US 11,012,254 B2
(45) Date of Patent: May 18, 2021

(54) METHOD AND APPARATUS FOR HANDLING CONTROLLER AREA NETWORK (CAN) MESSAGES IN A FUEL CELL SYSTEM

(71) Applicant: BLOOM ENERGY CORPORATION, Sunnyvale, CA (US)

(72) Inventors: Jayanth Moodliar, Bangalore (IN); Ali Zargari, Santa Clara, CA (US); Aditi Akula, Fremont, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 20 days.

(21) Appl. No.: 15/635,982

(22) Filed: Jun. 28, 2017

(65) Prior Publication Data

US 2019/0007233 A1 Jan. 3, 2019

(51) Int. Cl.
| | |
|---|---|
| *H04L 12/40* | (2006.01) |
| *H01M 8/1246* | (2016.01) |
| *H01M 8/04298* | (2016.01) |
| *H01M 8/124* | (2016.01) |

(52) U.S. Cl.
CPC ........ *H04L 12/40* (2013.01); *H01M 8/04298* (2013.01); *H01M 8/1246* (2013.01); *H01M 2008/1293* (2013.01); *H04L 2012/40215* (2013.01)

(58) Field of Classification Search
CPC ...... G08B 13/14; H01M 8/2465; H01M 8/02; H01M 8/0271; H01M 8/04208; H01M 16/006; H01M 8/04776; H01M 8/04686; H01M 8/04664; H01M 8/04246; H01M 8/04992; H01M 2008/1293; H01M 8/1246; F17C 2270/0763; G06F 8/654; G06F 9/44; B60R 16/023; H04L 12/40; Y10S 715/961
See application file for complete search history.

(56) References Cited

U.S. PATENT DOCUMENTS

| | | | |
|---|---|---|---|
| 6,111,888 A | * | 8/2000 | Green et al. |
| 7,599,760 B2 | | 10/2009 | Dutta et al. |
| 8,826,261 B1 | | 9/2014 | Anand et al. |
| 9,190,693 B2 | | 11/2015 | Sridhar et al. |
| 9,281,535 B2 | * | 3/2016 | Parakulam ........... G05B 19/042 |

(Continued)

OTHER PUBLICATIONS

TMS320C645x/C647x DSP User's Guide, Texas Instruments, Mar. 2006, Revised Aug. 2010, 60pgs.

(Continued)

*Primary Examiner* — Marsha D Banks Harold
*Assistant Examiner* — Dharmesh J Patel
(74) *Attorney, Agent, or Firm* — The Marbury Law Group PLLC (57) ABSTRACT

Systems, methods, and devices of the various embodiments may provide for the selective enablement and disablement of tags, such as control/process tags, in controller area network (CAN) networks, such as power generation systems, including fuel cell systems connected by a CAN bus. The selective enablement and disablement of tags, such as control/process tags, according to the various embodiments may enable management of CAN traffic such that CAN bandwidth may not be exceeded in CAN networks, such as fuel cell systems connected by a CAN bus.

20 Claims, 5 Drawing Sheets

(56) References Cited

U.S. PATENT DOCUMENTS

| | | | |
|---|---|---|---|
| 2003/0081632 A1* | 5/2003 | Kielhofer et al. |
| 2004/0088531 A1 | 5/2004 | Rothman |
| 2006/0031577 A1 | 2/2006 | Peluso et al. |
| 2006/0117313 A1 | 6/2006 | Yeh et al. |
| 2007/0142926 A1 | 6/2007 | Hopsecger |
| 2007/0243435 A1 | 10/2007 | Dutta et al. |
| 2009/0222242 A1 | 9/2009 | Kodama |
| 2011/0143661 A1 | 6/2011 | Hartwig et al. |
| 2013/0101873 A1* | 4/2013 | Dionne et al. |
| 2015/0029987 A1* | 1/2015 | Addepalli et al. |

OTHER PUBLICATIONS

TMS320C6472 Fixed-Point Digital Signal Processor, Texas Instruments, Product Preview, Jun. 2009, Revised Oct. 2010, 266pgs.
TMS320F2808, TMS320F2806, UCD9501, Texas Instruments, Digital Signal Processors, Product Preview, Mar. 2005, 69pgs.
TMS320x280x, 2801x, 2804x Boot ROM, Texas Instruments, Reference Guide, Nov. 2004, Revised Oct. 2006, 94pgs.

* cited by examiner

FIG. 1

| Byte7 | Byte6 | Byte5 | Byte4 | Byte3 | Byte2 | Byte1 | Byte0 |
|---|---|---|---|---|---|---|---|
| \multicolumn{4}{c}{H_Tag_Float_or_int1 (32-bit)} | | | | H_Tag_Float_or_int0 (32-bit) | | | |

HMI Message (CAN ID: 0x00110020) (packing 32-bit Control tags)

FIG. 2A

| Byte7 | Byte6 | Byte5 | Byte4 | Byte3 | Byte2 | Byte1 | Byte0 |
|---|---|---|---|---|---|---|---|
| H_Tag_Short3 (16-bit) | | H_Tag_Short2 (16-bit) | | H_Tag_Short1 (16-bit) | | H_Tag_Short0 (16-bit) | |

(CAN ID: 0x00110021) (packing 16-bit Control tags)

FIG. 2B

| Byte7 | Byte6 | Byte5 | Byte4 | Byte3 | Byte2 | Byte1 | Byte0 |
|---|---|---|---|---|---|---|---|
| H_Tag_Char7 (8-bit) | H_Tag_Char6 (8-bit) | H_Tag_Char5 (8-bit) | H_Tag_Char4 (8-bit) | H_Tag_Char3 (8-bit) | H_Tag_Char2 (8-bit) | H_Tag_Char1 (8-bit) | H_Tag_Char0 (8-bit) |

(CAN ID: 0x00110022) (packing 8-bit Control tags)

FIG. 2C (CAN ID: 0x00110023) (packing boolean Control tags)

FIG. 2D

| CAN ID | Byte7 | Byte6 | Byte5 | Byte4 | Byte3 | Byte2 | Byte1 | Byte0 |
|---|---|---|---|---|---|---|---|---|
| 0x00110024 | N/A | | | | P_Tag_Float_or_int0 | | | |
| 0x00110025 | N/A | | | | | | P_Tag_Short0 | |
| 0x00110026 | N/A | | | | | | | P_Tag_Char0 |
| 0x00110027 | N/A | | | | | | | B I T 0 |

FIG. 4 ent method for handling CAN messages based on tag states.

METHOD AND APPARATUS FOR HANDLING CONTROLLER AREA NETWORK (CAN) MESSAGES IN A FUEL CELL SYSTEM

FIELD

The present invention relates generally to controller area network (CAN) messaging, specifically, methods for packing and unpacking CAN messages.

BACKGROUND

A controller area network (CAN) bus allows for controlling, communicating, and monitoring complex equipment and systems, such as solid oxide fuel cell (SOFC) systems. However, CAN buses are limited as to the number of CAN messages that can be sent at a time over the CAN buses by the bandwidth of the CAN buses. CAN messages sent over CAN buses are of a set size, thereby limiting the number of CAN messages that may be monitored by the bandwidth of CAN buses.

SOFC systems include various hardware subsystems and controllers of each of these subsystems of SOFC systems can generate control/process tags to be monitored and/or displayed on a user interface of a SOFC system that may operate as the Human Machine Interface (HMI) between the user controlling the operation of the SOFC system and the SOFC system's hardware subsystems. The control/process tags from all subsystems of a SOFC systems can be transmitted in CAN messages across a CAN bus connecting the SOFC subsystems to a monitoring station. However, the number of CAN messages sent across a CAN bus in SOFC systems may overload the CAN bus when the amount of CAN traffic exceeds the CAN bus bandwidth.

SUMMARY

The systems, methods, and devices of the various embodiments may provide for the selective enablement and disablement of tags, such as control/process tags, in controller area network (CAN) networks, such as power generation systems, including fuel cell systems, such as solid oxide fuel cell (SOFC) systems connected by a CAN bus. The selective enablement and disablement of tags, such as control/process tags, according to the various embodiments may enable management of CAN traffic such that CAN bandwidth may not be exceeded in CAN networks, such as power generation systems, including fuel cell systems, connected by a CAN bus.

BRIEF DESCRIPTION OF THE FIGURES

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Fuel cell systems, such as solid oxide fuel cell (SOFC) systems, such as the fuel cell systems described in U.S. Patent Application Publication No. 2014/0009003, U.S. Pat. Nos. 8,440,362, 9,190,693, and 8,563,180 (all four of which are incorporated herein by reference in their entirety for all purposes), include various hardware subsystems, such as pumping devices (e.g., fuel pumps, water pumps, etc.), fuel cell stacks, fuel processing hardware, catalytic combustors, power conditioning subsystems (e.g., Direct Current (DC) to Alternative Current (AC) (DC/AC) inverters, etc.), control subsystems (e.g., supervisory controllers, etc.), air handling devices systems (e.g., blowers, controllable vents, etc.), and other various devices.

Controllers associated with the subsystems of SOFC systems generate control/process tags to be monitored and/or displayed on a user interface, such as a local monitoring station and/or remote monitoring station, that may operate as the Human Machine Interface (HMI) between the user controlling the operation of the SOFC system and the SOFC system's hardware subsystems. Each of the controllers may be associated with a controller area network (CAN) transceiver that is connected to a CAN bus interconnecting the controllers of the SOFC system. The control/process tags from all subsystems of a SOFC system can be transmitted in CAN messages across the CAN bus. However, the number of CAN messages sent across a CAN bus in SOFC systems may overload the CAN bus when the amount of CAN traffic exceeds the CAN bus bandwidth.

The systems, methods, and devices of the various embodiments may provide for the selective enablement and disablement of tags, such as control/process tags, in CAN networks, such as power generation systems connected by a CAN bus. The selective enablement and disablement of tags, such as control/process tags, according to the various embodiments may enable management of CAN traffic such that CAN bandwidth may not be exceeded in CAN networks, such as power generation systems connected by a CAN bus. While fuel cell systems, such as a SOFC systems, are described below as an example of a power generation system, other distributed and/or grid tied power generation systems may be used instead of or in addition to SOFC systems for selective enablement and disablement of tags, such as control/process tags, in CAN networks.

In various embodiments, the selective enablement and disablement of tags, such as control/process tags, may be user controlled and/or automatic. For example, one or more HMI messages from a SOFC system monitoring station, such as a local monitoring station and/or remote monitoring station, may enable or disable one or more control/process tags. As another example, a message or other input from a hardware subsystem to a CAN node, such as a controller of the SOFC system, may enable or disable one or more control/process tags for that hardware subsystem.

In various embodiments, CAN messages associated with enabled tags, such as enabled control/process tags, may be transmitted by CAN nodes and CAN messages associated with disabled tags, such as disabled/process tags, may be dropped. In various embodiments, a CAN node, such as a controller of a SOFC system connected to the CAN bus of the SOFC system, may store a state value for one or more tags, such as one or more control/process tags. The state value of a tag may indicate whether or not the tag is enabled or disabled. For example, a state value of "1" may indicate a tag is enabled and a state value of "0" may indicate a tag is disabled.

In various embodiments, a CAN message queued for transmit by a CAN node may include one or more tags, such as one or more control/process tags. The CAN node may compare any included tags to the stored state values for those tags prior to transmitting the CAN message and/or packing the CAN message with other CAN messages. In response to determining that at least one tag in the CAN message has a state value that indicates that tag is enabled, the CAN node may transmit the message and/or pack the CAN message with other CAN messages. In response to determining that all the tags in the CAN message have state values that indicate the tags are disabled, the CAN node may drop the message (e.g., remove the message from a transmit queue or otherwise prevent transmission and/or packing of the message).

In various embodiments, a CAN message received by a CAN node may include one or more tags, such as one or more control/process tags. The CAN node may compare any included tags to the stored state values for those tags prior to processing the received CAN message (e.g., taking an action in response to the received CAN message, unpacking the received CAN message, etc.). In response to determining that at least one tag in the received CAN message has a state value that indicates that tag is enabled, the CAN node may process the received CAN message (e.g., take an action in response to the received CAN message, unpack the received CAN message, etc.). In response to determining that all the tags in the CAN message have state values that indicate the tags are disabled, the CAN node may drop the received CAN message (e.g., not take an action in response to the received CAN message, not unpacking the received CAN message, drop the received CAN message, etc.).

Figure 1:
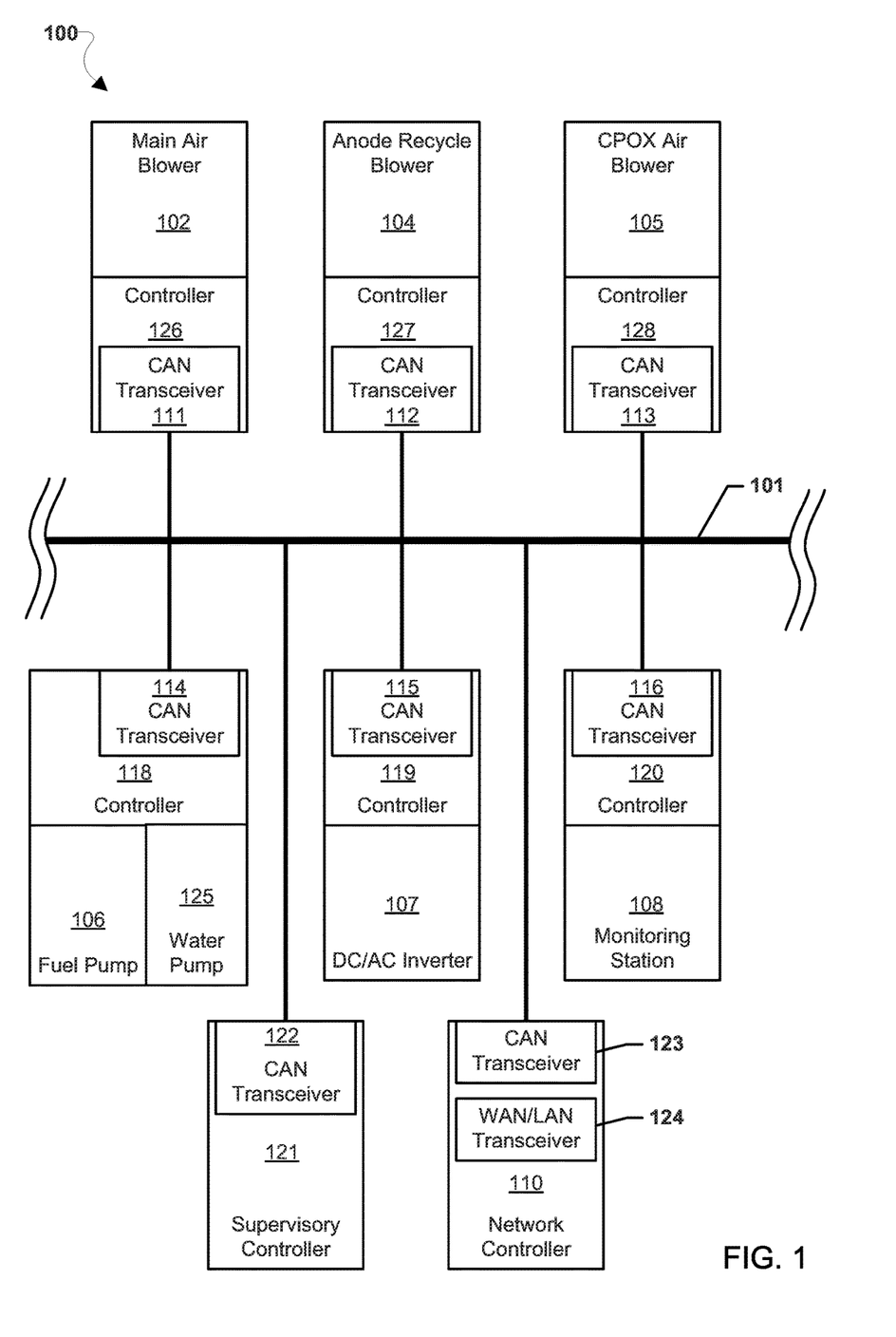
FIG. 1 is a block diagram of a portion of a SOFC system suitable for use with the various embodiments.

FIG. 1 is a block diagram of a portion of a SOFC system 100 including hardware devices (e.g., main air blower 102, anode recycle blower 104, Catalytic Partial Oxidation (CPDX) air blower 105, fuel pump 106, DC/AC inverter 107, monitoring station 108, network controller 110, supervisory controller 121, and water pump 125) connected to a CAN bus 101. Each of the hardware devices of the SOFC system 100 may be associated with one or more controller. For example, main air blower 102 may be connected to controller 126, anode recycle blower 104 may be connected to controller 127, CPDX air blower 105 may be connected to controller 128, fuel pump 106 and water pump 125 may be connected to controller 118, DC/AC inverter 107 may be connected to controller 119, and monitoring station 108 may be connected to controller 120. While illustrated as one-to-one and one-to-two configurations, other controller and hardware device configurations may be used in the SOFC system, such as two-to-one, one-to-many, and any other controller to hardware device connection configuration. Additionally, while discussed as connected together, the controllers may alternatively be integrated into the hardware devices themselves.

The controllers 118, 119, 120, 126, 127, and 128 associated with one or more hardware devices may be configured with controller executable instructions to monitor and control the operations of their respective associated hardware devices. The controllers 118, 119, 120, 126, 127, and 128 may be configured with controller executable instructions to monitor the state (e.g., activated, deactivated, idle, not reporting, etc.) of their respective associated hardware devices based on inputs from the hardware devices themselves and/or sensors monitoring the hardware devices. The controllers 118, 119, 120, 126, 127, and 128 may be configured with controller executable instructions to track the current state of their respective associated hardware and to change the state of their respective associated hardware (e.g., controller 118 may activate (turn on) fuel pump 106, controller 128 may deactivate (turn off) CPDX air blower 105 after a start-up period expires, etc.). Additionally, the controllers 118, 119, 120, 126, 127, and 128 may be configured with controller executable instructions to generate and/or execute one or more control/process tags for their respective associated hardware devices. As examples, control/process tags may report the state of a hardware device, may be instructions to change a state of a hardware device, etc. Periodically, in response to inputs from a hardware device, and/or in response to a request from another controller, the controllers 118, 119, 120, 126, 127, and 128 may receive and/or generate control/process tags. Control/process tags may be used in the SOFC system 100 to report the status of the hardware devices and may enable the state of the hardware device to be monitored and/or displayed on a user interface, such as a display of the locally connected monitoring station 108 and/or a display of a remote monitoring station connected to the SOFC system 100 via the network controller 110, that may operate as the HMI between the user controlling the operation of the SOFC system 100 and the hardware of the system 100.

The supervisory controller 121 may be a master controller overseeing the operations of the various hardware devices of the SOFC system 100 and may be configured with controller executable instructions to manage the overall operations of the SOFC system 100. The supervisory controller 121 may monitor the state (e.g., activated, deactivated, idle, etc.) of all the hardware devices and controllers in the SOFC system based on inputs from controllers, such as control/process tags in CAN messages. The supervisory controller 121 may be configured with controller executable instructions to track the current state of each hardware device in the SOFC system 100 and to change the state of the hardware devices via control/process tags in CAN messages sent to the various controllers of the SOFC system 100.

The network controller 110 may be a controller connecting the SOFC system 100 to a Wide Area Network (WAN) or Local Area Network (LAN) via a WAN/LAN transceiver (e.g., an Ethernet transceiver, cellular transceiver, etc.) Via the network controller 110 the SOFC system 100 may send/receive messages to/from a remote monitoring station. The messages sent/received may include control/process tags associated with the various hardware devices and controllers of the SOFC system 100 may enable remote monitoring and control of the SOFC system 100. The network controller 110 may be configured with controller executable instructions to convert CAN messages received via the CAN transceiver 123 to messages suitable for transmission via the WAN/LAN transceiver 124 (e.g., to convert CAN messages to Internet Protocol (IP) messages, etc.), and to convert messages received vi the WAN/LAN transceiver 124 to CAN messages for transmission via the CAN transceiver 123.

The monitoring station 108 and/or a remote monitoring station connected to the SOFC system 100 via the network controller 110 may enable a user to monitor the state of the hardware devices via a user interface (e.g., a touch screen display) and to provide control inputs to the SOFC system 100. Control/process tags received in CAN messages at the monitoring station 108 and/or a remote monitoring station connected to the SOFC system 100 via the network controller 110 may enable the output of status indications on the user interface. Control/process tags generated by the controller 120 of the monitoring station 108 and/or a remote monitoring station connected to the SOFC system 100 via the network controller 110 may be inserted into CAN messages by the controller 120 or network controller 110 to enable control of the state of the hardware devices of the SOFC system 100 via the user interface. Additionally, the controllers 118, 119, 120, 126, 127, and 128 may be configured with controller executable instructions to generate and/or execute one or more control/process tags for their respective associated hardware devices. Further one or more controllers 110, 118, 119, 120, 121, 126, 127, and/or 128 may be configured with controller executable instructions to track the state of one or more control/process tags. For example, one or more controllers 110, 118, 119, 120, 121, 126, 127, and/or 128 may store state indications, such as enablement tags or enable tag values (En_tag), for one or more control/process tags in a memory. For example, the controllers 110, 118, 119, 120, 121, 126, 127, and/or 128 may store a data table of tag IDs correlated with enable tag values in their respective memories. The enable tag value (En_tag) for a tag ID may indicate to the controller whether the tag is currently enabled or disabled. For example, an enable tag value (En_tag) set to "1" may indicate the tag is enabled and an enable tag value (En_tag) set to "0" may indicate the tag is disabled. Further, an enable tag value (En_tag) that is a null value may be handled in a special manner by a controller, such as by treating the tag ID associated with the null value as enabled or prioritized (e.g., always transmitted). Additionally, an enable tag value (En_tag) may be an indication of another tag ID. In this manner, the enable tag value (En_tag) of one tag ID may be a reference or call to the enable tag value (En_tag) of another tag ID. The use of a tag ID as an enable tag value (En_tag) may enable tags, such as control/process tags, to enable and/or disable by one another.

Each controller may be associated with a CAN transceiver connecting the controller to the CAN bus 101. For example, controller 126 may include CAN transceiver 111 connected to the CAN bus 101, controller 127 may include CAN transceiver 112 connected to the CAN bus 101, controller 128 may include CAN transceiver 113 connected to the CAN bus 101, controller 118 may include CAN transceiver 114 connected to the CAN bus 101, controller 119 may include CAN transceiver 115 connected to the CAN bus 101, controller 120 may include CAN transceiver 116 connected to the CAN bus 101, network controller 110 may include CAN transceiver 123 connected to the CAN bus 101, and supervisory controller 121 may include CAN transceiver 122 connected to the CAN bus 101. While illustrated and described as transceivers, CAN transceivers 111, 112, 113, 114, 115, 116, 122, and 123 may alternatively be receiver and transmitter pairs. Additionally, while discussed as included in the controllers 110, 118, 119, 120, 121, 126, 127, and 128, the CAN transceivers 111, 112, 113, 114, 115, 116, 122, and 123 may alternatively be separate devices connected to the controllers 110, 118, 119, 120, 121, 126, 127, and 128. The connections to the CAN bus 101 from the CAN transceivers 111, 112, 113, 114, 115, 116, 122, and 123, and the CAN bus 101 itself, may include one or more wires and/or other circuitry enabling the transmission of CAN messages between the CAN transceivers 111, 112, 113, 114, 115, 116, 122, and 123 and across the CAN bus 101.

Each CAN transceiver 111, 112, 113, 114, 115, 116, 122, and 123 and its respective associated controller 110, 118, 119, 120, 121, 126, 127, and 128 may be a CAN node and together the CAN nodes connected to the CAN bus 101 may constitute a CAN network. The CAN bus 101 may have a bandwidth that is limited by the physical properties and/or the capabilities of the CAN nodes and CAN bus 101 constituting the CAN network.

CAN messages sent and received by the CAN nodes in the SOFC system 100, to include CAN Human-Machine Interface (HMI) messages, may be packed or unpacked. The two messages types, packed and unpacked, may be treated differently by the CAN nodes. CAN messages may be limited in size, such as limited to a maximum size of 64-bits. A packed message may be a CAN message which may has two or more tags, such as control/process tags, associated with it. An unpacked message may be a CAN message which may only has a single tags, such as control/process tags, associated with it. Each tag, such as a control/process tag, may be associated with its own respective tag identifier (tag ID), and the tag ID may associate the tag with the various hardware devices of the SOFC system 100. In this manner, intended recipient device or devices for a CAN message may be indicated by the tag IDs in the CAN message.

Figure 2A:
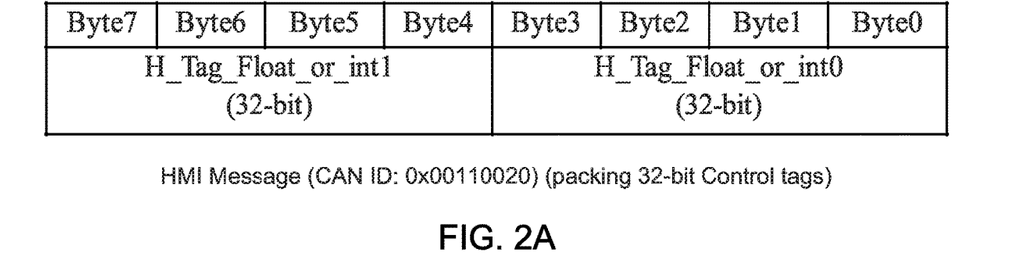
FIGS. 2A-2E illustrate example CAN messages suitable for use with the various embodiments.
Figure 2B:
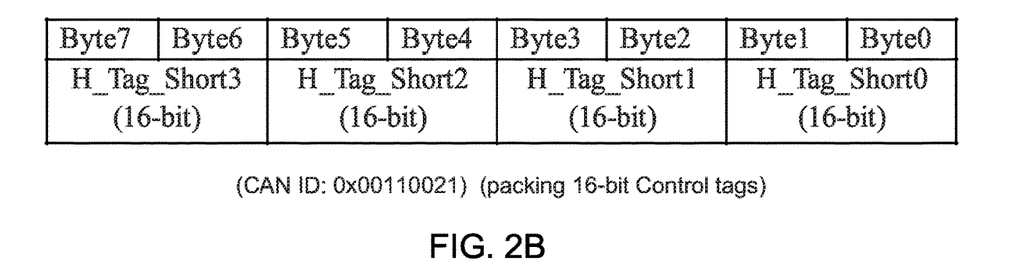
Figure 2C:
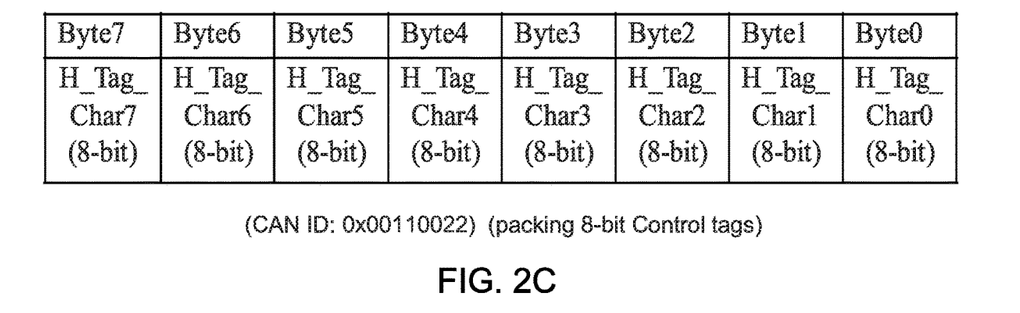
Figure 2D:
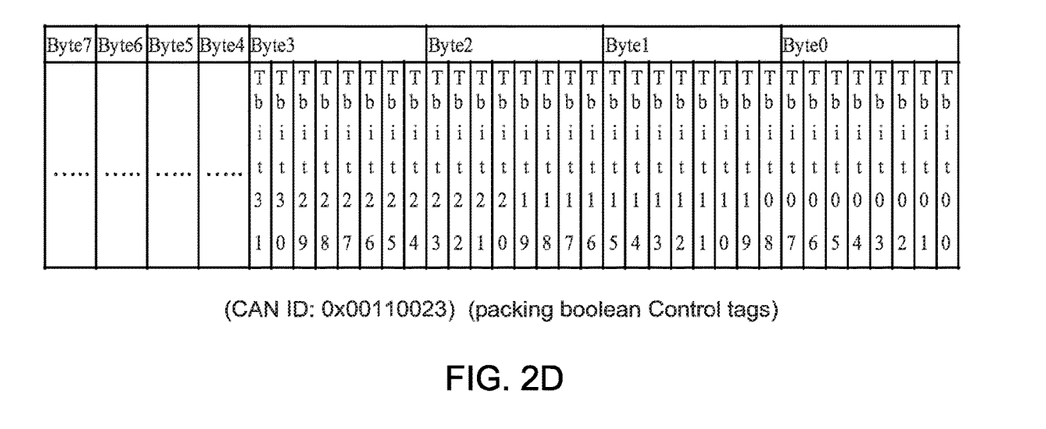
Figure 2E:
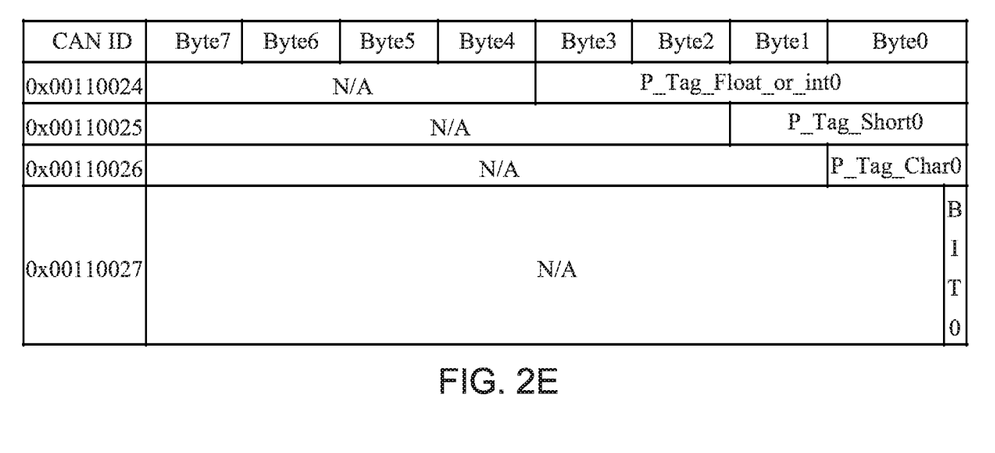

FIGS. 2A-2E illustrate various examples of packed and unpacked CAN messages. FIGS. 2A-2D illustrate four different example packed CAN messages. FIG. 2A illustrates a packed CAN HMI message with CAN ID: 0x00110020. The packed message illustrated in FIG. 2A may include two floating point or integer type tags H_Tag_Float_or_int1 and H_Tag_Float_or_int0, each of which is 32 bits in size. FIG. 2B illustrates a packed CAN message with CAN ID: 0x00110021. The packed message illustrated in FIG. 2B may include four short type tags H_Tag_Short3, H_Tag_Short2, H_Tag_Short1, and H_Tag_Short0, each tag being 16 bits in size. FIG. 2C illustrates a packed CAN message with CAN ID: 0x00110022. The packed message illustrated in FIG. 2C may include eight byte sized tags, H_Tag_Char0 to H_Tag_Char7, each byte being eight bits. FIG. 2D illustrates a packed message with CAN ID: 0x00110023 with 32 single bit Boolean tags from T0 to TBit31. FIG. 2E illustrates four different example unpacked CAN messages. A first CAN message with CAN ID 0X00110024 for a P_Tag_Float_or_int for floating point or integer tag type, a second CAN message CAN ID 0X00110025 for P_Tag_Short short tag type, a third CAN message CAN ID 0X00110026 for P_Tag_Char for character or byte tag type, and a fourth CAN message CAN ID 0X00110027 for Bit0 for bit or Boolean type tags.

Figure 3:
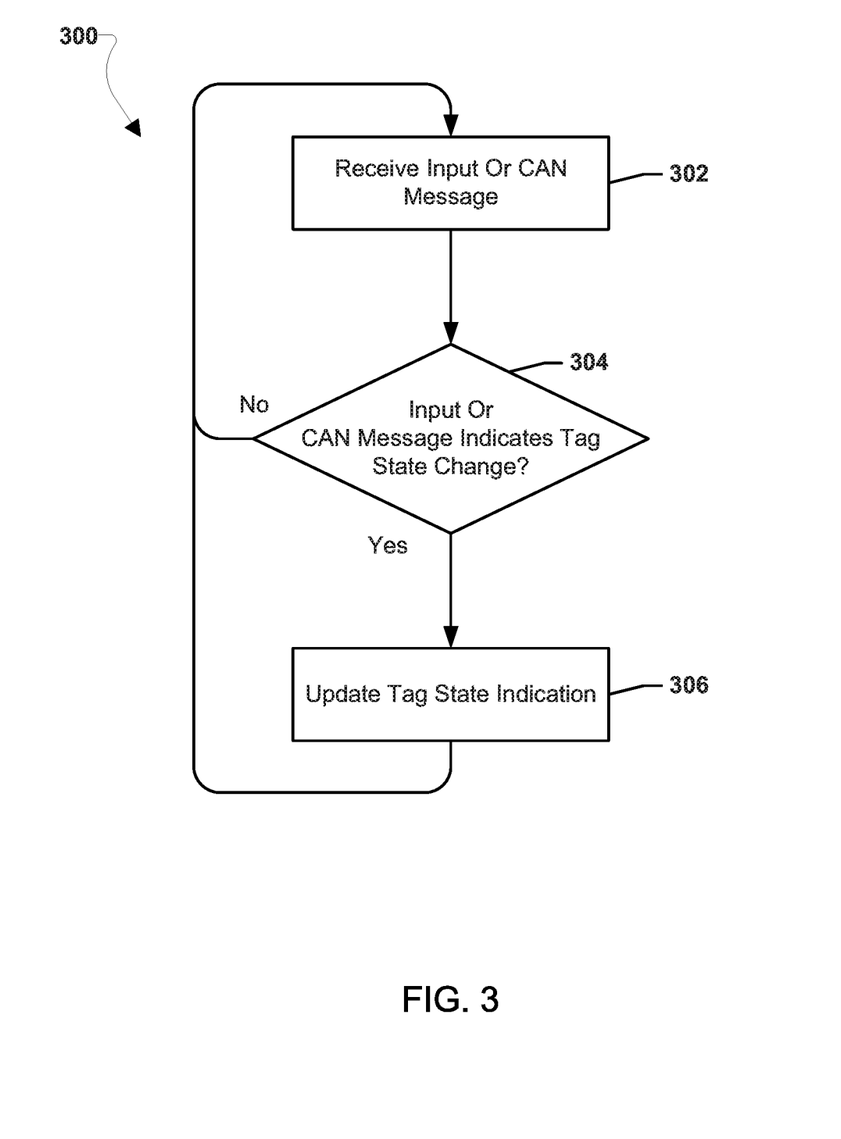
FIG. 3 is a process flow diagram illustrating an embodiment method for enabling and/or disabling a tag.

FIG. 3 is a process flow diagram illustrating an embodiment method 300 for enabling and/or disabling a tag, such as a control/process tag, in a SOFC system, such as SOFC system 100 described above. In various embodiments, the operations of method 300 may be performed by a controller, such as controller 110, 118, 119, 120, 121, 126, 127, and/or 128, to enable and/or disable a tag.

In block 302 the controller may receive an input or CAN message. For example, a controller may receive an input (e.g., sensor input, interrupt signal, etc.) from a hardware device indicating the current state (e.g., activated, deactivated, idle, not reporting, etc.) of that device. As another example, a controller may receive a CAN message from another controller and/or a monitoring station (remote and/or local) indicating a selected state for a hardware device associated with the controller. An input and/or CAN message may identify one or more hardware devices and/or tags with which the input and/or CAN message may be associated. For example, the CAN message may include one or more tag IDs. As another example, an input may identify the hardware device with which it is associated based on the port or pin of the controller on which the input was received and/or by device identifying indications in the input itself.

In determination block 304 the controller may determine whether the input or CAN message indicates a tag state change. The controller may determine whether the input or CAN message indicates a tag state change by comparing a hardware device or tag identified in the input or CAN message to a listing of tags and tag states in a memory available to the controller to determine whether the state in the input or CAN message is different than the state in the memory. For example, a tag may be enabled in memory when that tag's tag ID is associated with an enable tag value (En_tag) set to "1". Receiving a CAN message indicating the tag should be disabled by changing the enable tag value (En_tag) for that tag's tag ID to "0" would indicate a tag state change. As another example, receiving a CAN message indicating a tag state for a tag ID without a currently stored enable tag value (En_tag) may indicate a tag state change. Alternatively, the input and/or CAN message itself may indicate the input or CAN message reflect a state change. For example, a message payload or tag within the CAN message may be an instruction to change the state of an enable tag value (En_tag) for a specific tag ID. In various embodiments, an instruction to change the state of an enable tag value (En_tag) for a specific tag ID may be an instruction to change an enable tag value (En_tag) to a reference to another different tag ID. In this manner, tag IDs themselves may be enable tag values. In response determining that the input or CAN message do not indicate a tag state change (i.e., determination block 304="No"), the processor may continue to receive inputs or CAN messages in block 302.

In response to determining that the input or CAN message does indicate a tag state change (i.e., determination block 306="Yes"), the controller may update the tag state indication. For example, the controller may change an enable tag value (En_tag) for a specific tag ID to reflect a value indicating the tag is enable (e.g., "1") or disabled (e.g., "0"). As another example, the controller may delete an enable tag value creating a null value. As a further example, a controller may insert another tag ID as the enable tag value, thereby creating a reference to another tag's enable tag value and controlling the state of the current tag based on another tag's state. The controller may return to block 302 to handle the next input or CAN message.

Figure 4:
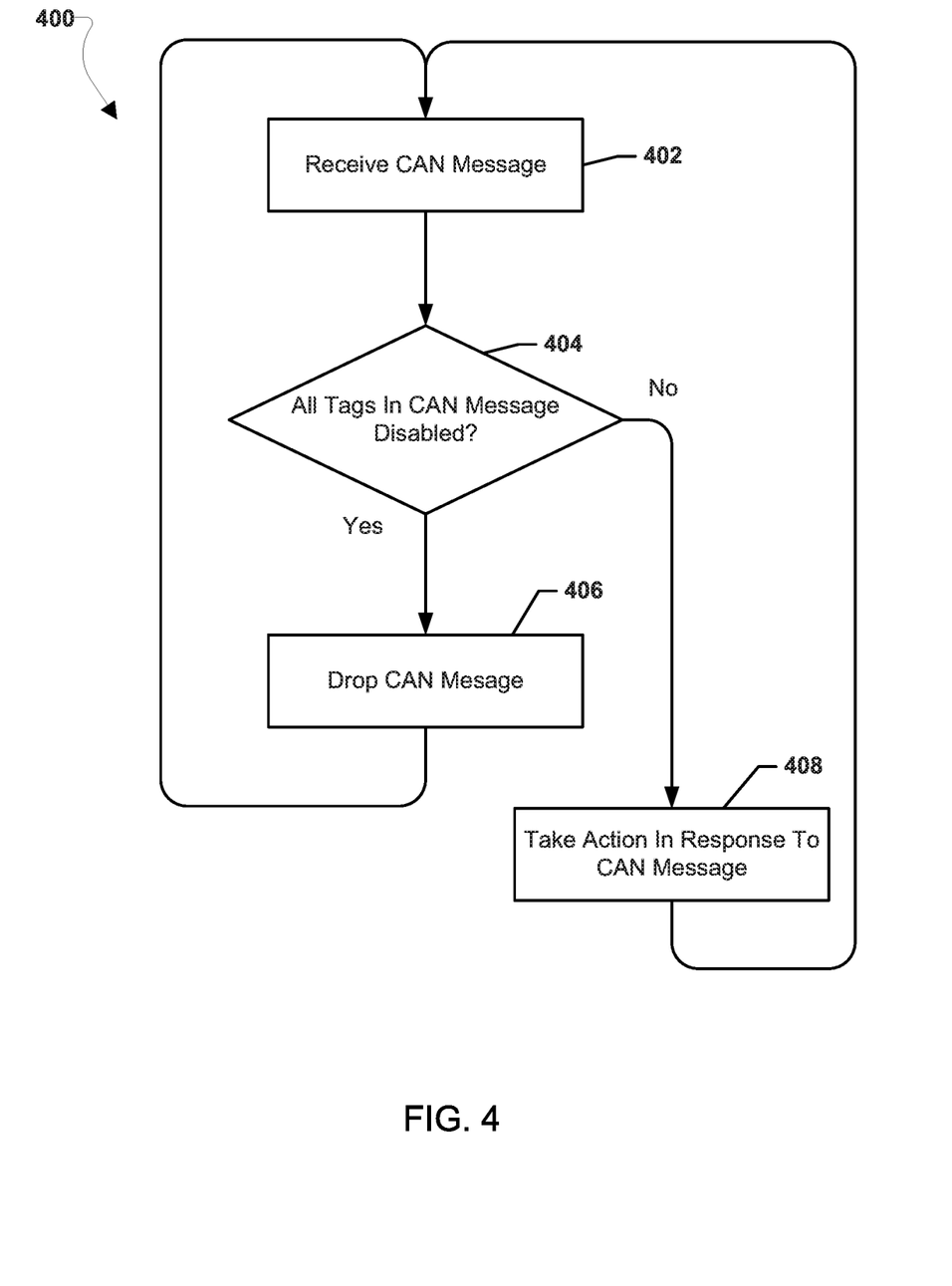
FIG. 4 is a process flow diagram illustrating an embodiment method for handling CAN messages based on tag states.

FIG. 4 is a process flow diagram illustrating an embodiment method 400 for handling CAN messages based on tag states, such as enable tag states associated with control/process tags, in a SOFC system, such as SOFC system 100 described above. In various embodiments, the operations of method 400 may be performed by a controller, such as controller 110, 118, 119, 120, 121, 126, 127, and/or 128. In various embodiments, the operations of method 400 may be performed in conjunction with the operations of method 300 described above.

In block 402 the controller may receive a CAN message. For example, the controller may receive a CAN message from a CAN bus, such as CAN bus 101, via a CAN transceiver. As another example, the controller may receive a CAN message by generating its own CAN message for transmission to the CAN bus in response to an input from a hardware device associated with the controller. The CAN message received in block 402 may include one or more tags, such as a one or more control/process tags. For example, the CAN message may be one of the CAN messages described above with reference to FIGS. 2A-2E. CAN messages may be received in block 402 for transmission onto other controllers, packing, unpacking, to cause an action in response to the CAN message to be taken for a hardware device, or for any other operation enabled for CAN messages.

In determination block 404 the controller may determine whether all tags in the CAN message are disabled. For example, the controller may compare each tag ID in the CAN message to a listing of tag IDs correlated with tag states, such as enable tag values (En_tag), stored in a memory of the controller to determine whether any tag state for a tag in the CAN message indicated that tag is disabled. For example, an enable tag value (En_tag) set to "1" may indicate the tag is enabled and an enable tag value (En_tag) set to "0" may indicate the tag is disabled. Further, an enable tag value (En_tag) that is a null value may be handled in a special manner by the controller, such as by treating the tag ID associated with the null value as enabled or prioritized (e.g., always transmit, always pack, etc.). Additionally, an enable tag value that is a tag ID referencing another tag's enable tag value may be determined to be enabled or disabled based on that other tag's enable tag value.

In response to determining all tags in the CAN message are disabled (i.e., determination block 404="Yes"), in block 406 the controller may drop the CAN message. Dropping the CAN message may include preventing the transmission of the CAN message, not packing the CAN message with other messages, or not taking an action indicated in the CAN message or in response to the CAN message, etc. Dropping CAN messages with all disabled tags may prevent the use of bandwidth on the CAN bus by CAN messages for inactive/non-priority devices, thereby conserving CAN bandwidth.

In response to determining all the tags in the CAN message are not disabled (i.e., determination block 404="No"), in block 408 the controller may take an action in response to the CAN message. Taking an action may include transmitting the CAN message, packing the CAN message, unpacking the CAN message, controlling the hardware device in response to the CAN message, etc. In this manner, CAN bus bandwidth may be allocated to CAN messages for active/priority devices.

As a specific example, referring to the tags illustrated in FIG. 2A, when the two tags in the message, H_Tag_Float_or_int1 and H_Tag_Float_or_int0 and both equal to "0", the pack transfer action for that message CAN_HMI_pack_Transfer(H_Tag_Float_or_int1, 0) and CAN_HMI_pack_Transfer(H_Tag_Float_or_int, 0) would be disabled because both values are "0"). As an alternative example, when the H_Tag_Float_or_int1 value is equal to "0" and the H_Tag_Float_or_int0 value is "1", the pack transfer action for that message CAN_HMI_pack_Transfer (H_Tag_Float_or_int1, 0) and CAN_HMI_pack_Transfer (H_Tag_Float_or_int0, 1) would be enabled. The same may hold true for other types and sizes of tags, if any single tag is enabled, even if it is a single bit tag, the entire message may be transmitted. If all of the tags are disabled, then the message may be disabled and set to not transmit.

As another example, referring to the tags illustrated in FIG. 2A, tags may be dynamically enabled and/or disabled by using other tags. The two tags in the message, H_Tag_Float_or_int1 and H_Tag_Float_or_int, may have enable tag value that are references/calls to other tags, such as &H_Tag_Float_or_int1_EN and &H_Tag_Float_or_int0_EN, respectively. If both those other tags &H_Tag_Float_or_int1_EN and &H_Tag_Float_or_int0_EN are disabled, the CAN pack transfer of the message would be disabled. If at least one of the other tags is null or enabled, the CAN pack transfer of the message would be enabled.

As further examples, referring to the unpacked messages in FIG. 2E, if tag P_Tag_Float_or_int is set to "0" the message CAN ID 0X00110024 including that tag, CAN_H-MI_unpack_call(P_Tag_Float_or_int, 0), would be dropped. If tag P_Tag_Short tag is "1", the message CAN ID 0X00110025, including the tag CAN_HMI_unpack_call (P_Tag_Short, 1) may be transmitted. Additionally, if P_Tag_Char and BIT0 tags are both "null" values, the messages with CAN ID 0X00110026 and CAN ID 0X00110027 will be always be transmitted.

Computer program code or "program code" for execution on a programmable controller for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a controller readable storage medium as used in this application may refer to machine language code (such as object code) whose format is understandable by a controller.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, components, circuits, and algorithm steps described in connection with the embodiments disclosed herein may be implemented as electronic hardware, computer software, or combinations of both. To clearly illustrate this interchangeability of hardware and software, various illustrative components, blocks, components, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, components, and circuits described in connection with the embodiments disclosed herein may be implemented or performed with a general purpose processor, a micro-controller, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A controller may be any device having a processor, microcontroller, and/or state machine that executes stored instructions via hardware, software, firmware, or any combination thereof.

In one or more exemplary embodiments, the functions described may be implemented in hardware, software, firmware, or any combination thereof. If implemented in software, the functions may be stored as one or more instructions or code on a non-transitory computer-readable medium or non-transitory controller-readable medium. The steps of a method or algorithm disclosed herein may be embodied in a controller-executable software component, which may reside on a non-transitory computer-readable or controller-readable storage medium. Non-transitory computer-readable or controller-readable storage media may be any storage media that may be accessed by a computer or a controller. By way of example but not limitation, such non-transitory computer-readable or controller-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and controller-readable media. Additionally, the operations of a method or algorithm may reside as one or any combination or set of codes and/or instructions on a non-transitory controller-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed:

1. A method for handling controller area network (CAN) messages in a fuel cell system, comprising:
   receiving, in a controller of the fuel cell system, a CAN message having at least one tag and at least one tag identifier, wherein the at least one tag is a control tag or a process tag associated with an operating state of at least one hardware device of the fuel cell system and the at least one tag identifier associates the at least one tag with the at least one hardware device of the fuel cell system, and wherein the at least one tag is associated with a plurality of operating states of the at least one hardware device and the operating state is included in the plurality of operating states;
   determining, in the controller, whether all tags in the CAN message are disabled; and dropping, in the controller, the CAN message in response to determining that all the tags in the CAN message are disabled.

2. The method of claim 1, further comprising:
taking an action by the controller in response to determining that all the tags in the CAN message are not disabled.

3. The method of claim 2, wherein the action is packing the CAN message into another CAN message, unpacking the CAN message, or transmitting the CAN message to a CAN bus.

4. The method of claim 2, wherein determining whether all tags in the CAN message are disabled comprises comparing each tag identifier in the CAN message to a listing of tag identifiers correlated with tag states stored in a memory of the controller.

5. The method of claim 4, wherein the tag states are enable tag values.

6. The method of claim 5, wherein the tag states represent the operating state of a hardware device of the fuel cell system controlled by the controller.

7. The method of claim 6, wherein the CAN message is a CAN Human Machine Interface (HMI) message.

8. The method of claim 1, wherein the fuel cell system comprises a solid oxide fuel cell system.

9. A fuel cell system, comprising:
a controller area network (CAN) bus; and
a controller connected to the CAN bus, wherein the controller is configured to perform operations comprising:
receiving a CAN message having at least one tag and at least one tag identifier, wherein the at least one tag is a control tag or a process tag associated with an operating state of at least one hardware device of the fuel cell system and the at least one tag identifier associates the at least one tag with the at least one hardware device of the fuel cell system, and wherein the at least one tag is associated with a plurality of operating states of the at least one hardware device and the operating state is included in the plurality of operating states;
determining whether all tags in the CAN message are disabled; and
dropping the CAN message in response to determining that all the tags in the CAN message are disabled.

10. The fuel cell system of claim 9, wherein the controller is configured to perform operations further comprising:
taking an action in response to determining that all the tags in the CAN message are not disabled.

11. The fuel cell system of claim 10, wherein the action is packing the CAN message into another CAN message, unpacking the CAN message, or transmitting the CAN message to the CAN bus.

12. The fuel cell system of claim 11, wherein determining whether all tags in the CAN message are disabled comprises comparing each tag identifier in the CAN message to a listing of tag identifiers correlated with tag states stored in a memory of the controller.

13. The fuel cell system of claim 12, wherein the tag states are enable tag values.

14. The fuel cell system of claim 13, further comprising at least one hardware device connected to the controller, wherein the tag states represent the operating state of the hardware device.

15. The fuel cell system of claim 14, wherein the CAN message is a CAN Human Machine Interface (HMI) message.

16. The fuel cell system of claim 9, wherein the fuel cell system comprises a solid oxide fuel cell system.

17. A method for handling controller area network (CAN) messages in a power generation system, comprising:
receiving, in a controller of the power generation system, a CAN message having at least one tag and at least one tag identifier, wherein the at least one tag is a control tag or a process tag associated with an operating state of at least one hardware device of the power generation system and the at least one tag identifier associates the at least one tag with the at least one hardware device of the power generation system, and wherein the at least one tag is associated with a plurality of operating states of the at least one hardware device and the operating state is included in the plurality of operating states;
determining, in the controller, whether all tags in the CAN message are disabled; and
dropping, in the controller, the CAN message in response to determining that all the tags in the CAN message are disabled.

18. The method of claim 17, further comprising:
taking an action by the controller in response to determining that all the tags in the CAN message are not disabled.

19. The method of claim 18, wherein the action is packing the CAN message into another CAN message, unpacking the CAN message, or transmitting the CAN message to a CAN bus.

20. The method of claim 18, wherein determining whether all tags in the CAN message are disabled comprises comparing each tag identifier in the CAN message to a listing of tag identifiers correlated with tag states stored in a memory of the controller.

* * * * *